(12) United States Patent
Fellabaum (10) Patent No.: US 8,944,803 B2
(45) Date of Patent: Feb. 3, 2015

(54) MACHINE AND METHOD FOR PRODUCING EXTRUDED CONCRETE PRODUCT

(75) Inventor: Terence J. Fellabaum, Hartland, WI (US)

(73) Assignee: TEC Products, Inc., Hartland, WI (US)

( * ) Notice: Subject to any disclaimer, the term of this patent is extended or adjusted under 35 U.S.C. 154(b) by 653 days.

(21) Appl. No.: 13/110,873

(22) Filed: May 18, 2011

(65) Prior Publication Data

US 2011/0287119 A1 Nov. 24, 2011

Related U.S. Application Data

(60) Provisional application No. 61/345,747, filed on May 18, 2010.

(51) Int. Cl.
| | | |
|---|---|---|
| *B28B 3/24* | (2006.01) | |
| *B29C 47/54* | (2006.01) | |
| *B29C 47/00* | (2006.01) | |
| *B29C 47/92* | (2006.01) | |
| *B29C 47/76* | (2006.01) | |

(52) U.S. Cl.
CPC .............. *B29C 47/54* (2013.01); *B29C 47/0004* (2013.01); *B29C 47/0019* (2013.01); *B29C 47/92* (2013.01); *B29C 47/0038* (2013.01); *B29C 47/767* (2013.01); *B29C 2947/92019* (2013.01); *B29C 2947/92514* (2013.01); *B29C 2947/92523* (2013.01); *B29C 2947/92723* (2013.01); *B29C 2947/92876* (2013.01)
USPC ........ 425/376.1; 425/203; 425/204; 425/205; 425/308; 425/461

(58) Field of Classification Search
CPC ...... B28B 3/24; B28B 11/16; B29C 47/0066; B29C 47/54
USPC .............. 425/203, 204, 205, 308, 376.1, 380, 425/461
See application file for complete search history.

(56) References Cited

U.S. PATENT DOCUMENTS

| | | | | |
|---|---|---|---|---|
| 287,699 | A | * | 10/1883 | Meeker ............................ 52/596 |
| 2,485,523 | A | * | 10/1949 | Ashbaugh ..................... 425/145 |
| 2,537,920 | A | | 1/1951 | Smith |
| 3,989,230 | A | | 11/1976 | Martens |
| 4,050,865 | A | | 9/1977 | Drostholm et al. |

(Continued)

FOREIGN PATENT DOCUMENTS

GB 501277 * 8/1938

*Primary Examiner* — Yogendra Gupta
*Assistant Examiner* — Joseph Leyson
(74) *Attorney, Agent, or Firm* — Boyle Fredrickson S.C.

(57) ABSTRACT

A machine and method of extruding concrete building product, e.g., brick, tile, paver, or shingles, and concrete mixture therefor. The mixture has aggregate, liquid and binder that includes fly ash and can include slag with moisture content controlled producing a zero or negative slump loose feed mixture compacted in a consolidation chamber of the machine into increased density consolidated mixture extruded from an extrusion chamber in communication with the consolidation chamber with compaction force being generally transverse to extrusion force. Compaction force is maintained during extrusion through a die of non-tapering construction. Where the extruded product is a brick, the extruded slug is cut into a plurality of bricks using a rotary cutter having an offset forming an increased moisture absorbing region in the cut surface of each brick formed from the slug that better bonds with mortar during bricklaying.

24 Claims, 3 Drawing Sheets

(56) References Cited

U.S. PATENT DOCUMENTS

| | | |
|---|---|---|
| 4,067,676 A | 1/1978 | Hewitt |
| 4,153,404 A | 5/1979 | Ottman |
| 4,164,537 A | 8/1979 | Drostholm et al. |
| 4,178,340 A | 12/1979 | Hyytinen |
| 4,193,272 A * | 3/1980 | Bernard .................. 62/320 |
| 4,229,156 A | 10/1980 | Hyytinen |
| 4,259,282 A | 3/1981 | Goldsmith |
| 4,417,864 A | 11/1983 | Shigeo et al. |
| 4,455,921 A | 6/1984 | Griesbach |
| 4,548,565 A | 10/1985 | Bunn |
| 4,566,823 A | 1/1986 | May |
| 4,569,649 A | 2/1986 | Gross |
| 4,698,010 A | 10/1987 | Toncelli |
| 4,802,836 A | 2/1989 | Whissell |
| 4,869,660 A | 9/1989 | Ruckstuhl |
| 4,944,907 A | 7/1990 | Davis |
| 5,123,831 A | 6/1992 | Enqvist et al. |
| 5,173,005 A | 12/1992 | Henderson et al. |
| 5,183,616 A | 2/1993 | Hedrick |
| 5,545,297 A | 8/1996 | Andersen et al. |
| 5,571,464 A | 11/1996 | Aaseth et al. |
| 5,587,187 A | 12/1996 | Benade |
| 5,629,033 A | 5/1997 | Lienau |
| 5,770,244 A | 6/1998 | Braungardt et al. |
| 5,846,576 A | 12/1998 | Braungardt et al. |
| 5,891,374 A | 4/1999 | Shah et al. |
| 5,948,449 A | 9/1999 | Chen |
| 6,177,039 B1 | 1/2001 | Aaseth et al. |
| 6,309,570 B1 * | 10/2001 | Fellabaum .................. 264/40.1 |
| 6,322,731 B1 | 11/2001 | Pagden |
| 6,331,069 B1 | 12/2001 | Putti |
| 2005/0120670 A1 | 6/2005 | Ness et al. |
| 2005/0144897 A1 | 7/2005 | Breedlove |
| 2009/0218720 A1 | 9/2009 | Chen et al. |

* cited by examiner

MACHINE AND METHOD FOR PRODUCING EXTRUDED CONCRETE PRODUCT

CROSS REFERENCE TO RELATED APPLICATION

This application claims priority under 35 U.S.C. §119(e) to U.S. Provisional Patent Application No. 61/345,747, filed May 18, 2010, the entirety of which is hereby expressly incorporated by reference herein.

FIELD

The present invention relates to concrete products and, more particularly, to a method of formulating concrete feed mixture, to a method of processing the concrete feed mixture and extruding it in forming concrete product as well as to a machine therefor and to an extruded concrete product.

BACKGROUND

Cementitious materials, or materials that include cement, e.g., Portland cement, as a binding agent, are commonly used in a variety of building applications including masonry applications. Most common concrete structures and concrete building products formed of such cementitious materials are precast or cast-in-place. Cast-in-place structures typically include walls, curbs, walkways, and flat surfaces such as floors, drives and roads. Cast-in-place refers to the extensive preparation of the site and commonly includes the positioning of various concrete forms. Precast concrete building products, such as barrier or retaining blocks and spanning concrete structures, are commonly formed by pouring a flowable cementitious feed mixture into a form, such as a slip form, which is frequently located remote from the site where the products are actually used. That is, such precast materials are commonly first cast or poured to form a concrete product or article, cured, and then transported to a location where they are used.

While brick, floor and roofing tile, shingles, pavers and curbing can also be precast, efforts have been undertaken in the past to make these concrete products using an extrusion process. While some of these efforts have met with limited commercial success, more widespread commercial acceptance has been lacking because these concrete products often possess drawbacks when compared to their non-concrete counterparts. Controlling the extrusion process to extrude concrete products in a repeatable manner so their properties are consistent from one concrete product to the next has proven challenging. Extruding concrete products that stand up to the elements over time has been another limiting factor. Extruding concrete products that work well in masonry applications has also limited acceptance.

Controlling the repeatability of extruding concrete products so they possess low porosity and high enough strength for their intended application has been extremely challenging. Since concrete products continue to shrink over time, many contractors limit their use only to those applications where such shrinkage will not pose a problem. In addition, since these concrete products typically also possess considerable porosity, especially when compared to their non-concrete counterpart, their tendency to absorb moisture has also limited widespread application. For example, when compared to their non-concrete counterparts, water is absorbed by concrete building products at a much higher rate. Since concrete building products are commonly exposed to the elements, their greater tendency to absorb water is undesirable because the water can seep completely through concrete building products which can result in water damage within the structure formed by the products as well as to the structure itself. Depending on how water saturated concrete building products have become, freeze-thaw cycling can undesirably damage them in a manner that adversely impacts appearance or even their integrity.

One type of commercially available concrete building product that suffers from these and other drawbacks is concrete facing brick used in masonry construction. Concrete facing brick has encountered significant resistance in replacing clay brick for many reasons. It has been difficult to make a concrete facing brick, also known as a concrete masonry unit, having a similar look and feel to that of clay brick because concrete bricks typically lack the texture and coloration of clay bricks. In addition, as a result of concrete bricks continuing to shrink after they have been laid, control joints are required to help control cracking that tends to occur due to shrinkage. Unfortunately, control joints must be sealed with joint sealant with the sealant typically requiring periodic replacement increasing cost. Since concrete bricks are more porous, they typically possess a greater moisture absorption rate than clay brick, which can lead to seepage, structural damage, and loss of brick integrity. These and other drawbacks have significantly limited the commercial acceptance of concrete brick despite being significantly cheaper than clay brick.

What is needed is a machine and method for producing concrete building products having fewer drawbacks than those on the market today. What is also needed is a concrete mixture that is particularly well-suited for making concrete building products having reduced shrinkage and lower moisture absorption. What is also needed is a machine, method and mixture that is capable of being used to make concrete bricks having reduced shrinkage, lower moisture absorption and improved texture and surface characteristics.

SUMMARY

The present invention is directed to a concrete extrusion machine, method of concrete extrusion and concrete mixture used to produce improved concrete products possessing reduced shrinkage, lower moisture portion, improved strength, and/or greater durability. The concrete extrusion machine includes a consolidation chamber used to consolidate a loose concrete feed mixture into a more dense consolidated concrete mixture that is extruded from an extrusion chamber in communication with the consolidation chamber through an extrusion die forming a slug that is cut into individual concrete products. In a preferred embodiment, the concrete extrusion machine includes an extrusion die having a plurality of pairs of opposed, substantially parallel, and generally planar internal die cavity walls defining a die cavity of non-tapering construction having an opening in fluid flow communication with the extrusion chamber. In a preferred method of extruding a concrete building product, a consolidation chamber holding a charge sufficient to perform a plurality of extrusion cycles is filled with loose concrete feed mixture to a desired fill level before the loose concrete feed mixture in the chamber is densified into a consolidated mixture using at least a compaction force applied against the mixture with application of compaction force against the consolidated mixture in the consolidation chamber and extrusion chamber being maintained during extrusion.

One preferred concrete mixture suitable for use in extruding a concrete building product in accordance with the present invention is formed from aggregate, liquid, e.g. water, and one or more binders mixed together with the moisture controlled to produce a loose concrete feed mixture having about a zero slump or negative slump possessing a moisture content of about 6%. One preferred mixture includes fly ash added as a binder and/or aggregate and which can include slag, such as ground granulated blast furnace slag (e.g., GGBS or GGBFS).

A concrete product extrusion system includes a concrete mixer used to mix such constituents together to form a loose concrete feed mixture that is conveyed by a conveyance apparatus, such as a conveyor or hopper, to a concrete product extrusion machine constructed in accordance with the present invention. The extrusion machine can include a feed drawer in fluid flow communication with the consolidation chamber that receives the conveyed loose concrete feed mixture and delivers it into the chamber until the chamber is filled to a desired fill level. Where equipped with a feed drawer, the feed drawer includes a reciprocating feed drawer head that urges conveyed loose concrete feed mixture into the consolidation chamber when extended and which can level loose concrete feed mixture in the chamber when retracted back to a home position to help ensure the chamber is filled to the desired fill level. Where equipped with a feed drawer, a reciprocating seal plate can be actuated to seal a port through which the feed drawer delivers loose concrete feed mixture into the chamber when the chamber has been filled.

A plurality of fill level sensors can be disposed in communication with concrete mixture in the consolidation chamber and be monitored by a controller used to control extrusion machine operation. In filling the consolidation chamber, the fill level sensors are monitored by the controller in controlling the amount of loose concrete feed mixture conveyed to the chamber to ensure the chamber is filled to the desired fill level. Where the extrusion machine is filled using a feed drawer, the controller also controls feed drawer operation in filling the chamber.

The consolidation chamber is disposed in fluid flow communication with the extrusion chamber having a cross-sectional surface area transverse to its longitudinal extent substantially the same as the cross-sectional surface area of the extrusion chamber extending in a direction generally parallel to a longitudinal extent of the extrusion chamber. In another preferred embodiment, the consolidation chamber overlies the extrusion chamber with the consolidation chamber having a cross-sectional area generally transverse to the direction of applied force of the compaction drive during consolidation that is substantially the same as the cross-sectional surface area of the extrusion chamber extending in a direction generally parallel to the direction of applied force of the extrusion drive during extrusion. A reciprocating seal plate is provided that can be an integral part of an extrusion drive that is extended to a sealing position at or adjacent a bottom of the consolidation chamber prior to or during filling providing a floor for the chamber during densification in consolidating the loose concrete feed mixture into a consolidated concrete mixture ready for extrusion. The seal plate functions as a door that is retracted when it is desired to allow consolidated mixture into the extrusion chamber.

A vacuum system controlled by the controller is provided in fluid flow communication with the consolidation chamber to apply a vacuum during consolidation of the loose concrete feed mixture into the consolidated concrete mixture to remove air and gases in the mixture to reduce porosity. The controller monitors the pressure of the vacuum within the chamber by monitoring operation of a vacuum pump of the vacuum system and/or at least one pressure sensor during vacuum system operation in consolidating the loose mixture into a densified consolidated mixture having a level of compaction less than one hundred percent compaction to prevent the extruded concrete product produced during extrusion machine operation from being damaged by freeze-thaw cycling.

The concrete product extrusion machine has a compaction drive that includes a compaction head that is extended against the concrete mixture in the consolidation chamber to further compact or densify the mixture during consolidation. In a preferred implementation of a method of concrete product extrusion machine operation, the vacuum remains applied during compaction and extrusion. In a preferred compaction drive embodiment, the drive includes at least one hydraulic cylinder having a reciprocable piston driving the compaction head with operation of the drive controlled by the controller. In one preferred drive embodiment, a plurality of hydraulic cylinders drive the head with the head having a generally flat or planar compacting surface of a cross-section substantially the same as the transverse cross section of the consolidation chamber.

During compaction, the controller actuates the compaction drive and monitors compaction drive operation via feedback that preferably includes pressure or force feedback monitoring to determine when the concrete feed mixture being consolidated has been densified to a density greater than the loose concrete feed mixture that is at least as great as a desired predetermined density having a compaction less than one hundred percent and which can fall within a predetermined desired density range. In one preferred method of compaction drive operation, the controller monitors each hydraulic cylinder of the compaction drive during pressure or force feedback monitoring in controlling hydraulic cylinder operation. During drive operation, the cylinder is extended urging the compaction head against concrete mixture in the consolidation chamber applying a force against the concrete mixture until the force monitored by the controller reaches a magnitude corresponding to the density of the concrete miniature being densified or consolidated to have at least a desired predetermined density or falling within a desired predetermined density range.

When a desired predetermined density or density range has been reached such that the loose concrete mixture has been densified into consolidated concrete mixture, the seal plate door is retracted allowing the head of consolidated mixture into the extrusion chamber. Where the seal plate door is an integral part of the extrusion drive, an extrusion head of the drive is retracted to a home position also retracting the seal plate door substantially simultaneously therewith. Where the consolidation chamber generally vertically overlies the extrusion chamber, retraction of the seal plate door allows gravity to assist in encouraging the head of consolidated mixture into the extrusion chamber.

After retraction of the seal plate door, the compaction head is extended farther outwardly maintaining engagement or until it re-engages the consolidated mixture after displacement into the extrusion chamber to maintain consolidation density of the mixture during extrusion. In one preferred implementation of a method of operation of the concrete product extrusion machine in accordance with the present invention, the compaction head is extended to displace the head of consolidated mixture so at least part of the consolidated mixture enters and fills up the extrusion chamber with the compaction head remaining extended during extrusion to apply a force against the concrete mixture that maintains the mixture at the desired consolidation density or within the desired consolidation density range. The extrusion chamber includes a vent controlled by the controller that is opened when consolidated mixture is filling the extrusion chamber to allow air in the chamber to vent and that is closed during extrusion.

During extrusion, the extrusion head of the extrusion drive is outwardly extended toward the die while the compaction drive is operated to maintain the consolidation density of the concrete mixture in the consolidation chamber which also maintains the consolidation density of the concrete mixture in the extrusion chamber. In a preferred extrusion drive embodiment, the extrusion drive includes at least one hydraulic cylinder having a reciprocable piston that drives the extrusion head with the cylinder in communication with the controller that controls the extrusion drive operation. In one preferred embodiment, the drive includes a pair of generally parallel hydraulic cylinders each having a reciprocable piston driving a common extrusion head to provide a great enough force to extrude the consolidated mixture of the extrusion die while maintaining the density of the mixture substantially uniformly throughout the mixture being extruded.

In a preferred extrusion die embodiment, the die cavity is formed of a plurality of pairs of opposed and generally parallel sidewalls with the die including at least one pair of spaced apart and generally parallel trim bars inboard a respective one of the pair of generally parallel die cavity defining side walls that trim the concrete mixture being extruded out the die to a desired width or thickness. Where the concrete product being extruded is a facing brick or masonry brick, the die can include a core hole forming arrangement having a crossbar extending from one die cavity defining wall to another die cavity defining wall that carries a plurality of spaced apart brick core hole forming cylindrical cores.

During extrusion drive operation, extension of the extrusion head extrudes concrete mixture out the die in the form of an elongate slug that is then cut to a desired size using a cutter that cuts a plurality of extruded concrete products from the slug. One preferred cutter has a plurality of generally circular rotary cutting blades carried by a rotary shaft. Where the concrete product being made is a facing brick or masonry brick, such a cutter preferably includes at least one tooth extending outwardly from a generally planar spider of each rotary cutting blade at an acute angle relative to the spider, engaging the surface of the brick being cut from the slug in a manner that imparts to the outer cut surface of the brick, a region having increased porosity that possesses greater moisture absorption that better bonds with mortar during bricklaying.

Another preferred cutter has a plurality of cutting arms that extend radially outwardly from the rotary shaft. Where the concrete product being made is a facing brick or masonry brick, at least a portion of a leading edge of at least one of the cutting arms of the cutter has an axially outwardly extending offset edge that forms such an increased moisture absorption region in each outer cut surface of the brick to improve mortar bonding.

Other advantages, benefits and features of the present invention will become apparent to those skilled in the art upon reading the detailed description below and viewing the drawings accompanying herewith.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 1:
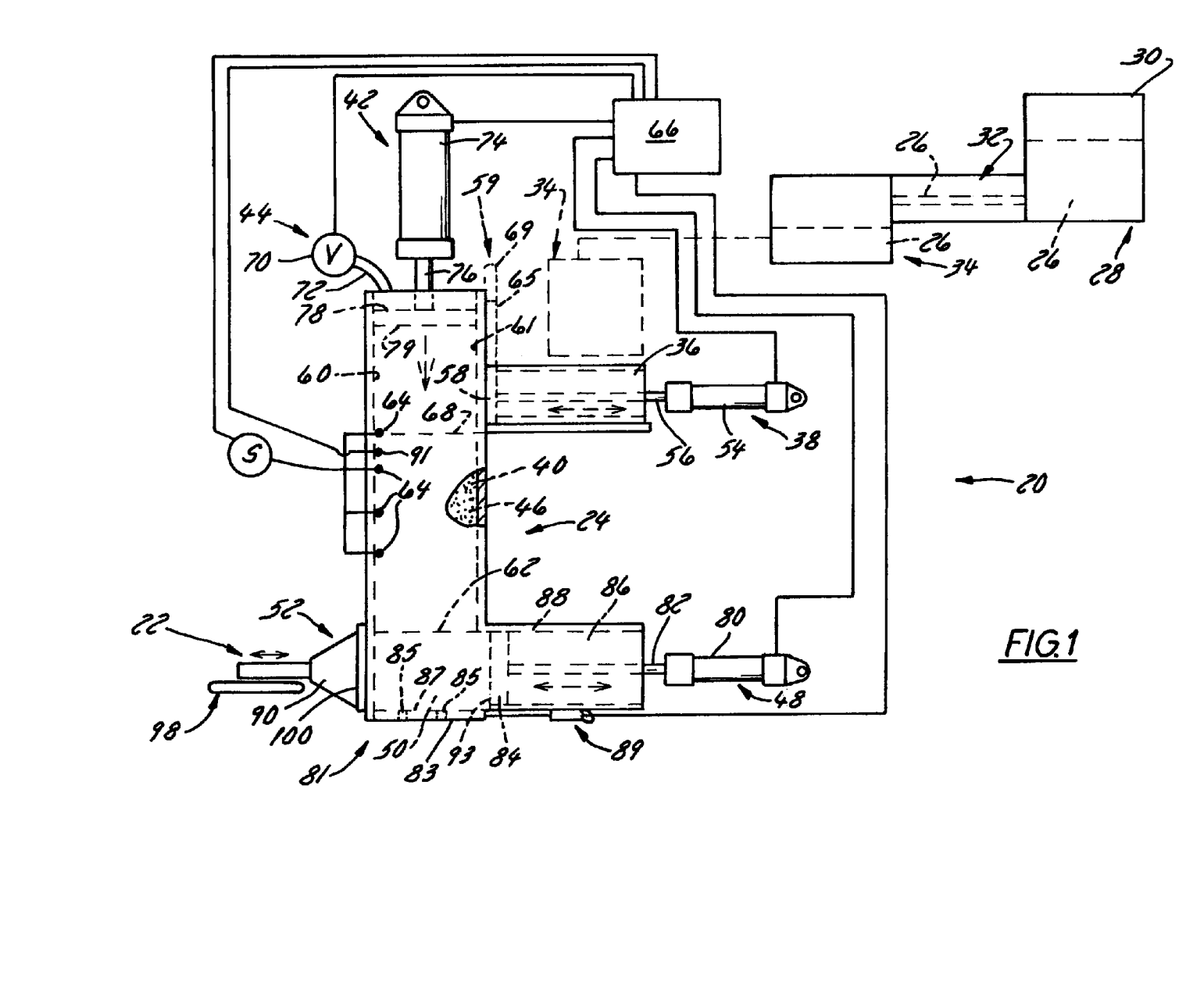
FIG. 1 is a is a schematic layout of a system constructed in accordance with the present invention having an extrusion machine.

FIG. 1 illustrates a system 20 for producing extruded concrete product 22 using a concrete product extrusion machine 24 supplied with a loose concrete feed mixture 26 from a mixing apparatus 28 that is consolidated into a consolidated concrete mixture 46 that is extruded from the machine 24. The mixing apparatus 28 includes a mixer 30 that mixes together constituents to produce a loose concrete feed mixture 26. After mixing, the loose concrete feed mixture 26 is delivered to the extrusion machine 24, such as by using a conveyor 32 that transfers the loose concrete feed mixture 26 from the mixer 30 to a batch hopper 34 that shuttles between the conveyor 32 and a feed drawer 36 of the extrusion machine 24.

The feed drawer 36 includes a feed drive 38 that conveys loose concrete feed mixture 26 received from the hopper 34 into a vertically extending consolidation chamber 40 inside the extrusion machine 24. A compaction drive 42 and vacuum system 44 are used to consolidate the loose concrete feed mixture 26 within the consolidation chamber 40 into a consolidated concrete mixture 46 having an increased density that is suitable for extrusion. After consolidation, an extrusion drive 48 extrudes consolidated mixture 46 received in an extrusion chamber 50 out a die 52 at an end of the extrusion chamber 50 producing concrete product 22 further increasing density as it passes through the die 52. Post-extrusion processing can be performed on the concrete product 22, such as is discussed in more detail below, such as for forming one or more finished concrete products.

The loose concrete feed mixture 26 includes aggregate, liquid, e.g., water, along with one or more binders mixed together using the mixer 30. Suitable binders include hydraulically settable binders, such as materials that are typically inorganic that bind together the constituents of the feed mixture upon reaction with water, i.e., upon hydration, in an exothermic reaction. Examples of suitable binders include cement, gypsum, calcium oxide, fly ash, slag, e.g. ground granulated blast furnace slag (GGBS or GGBFS), or a combination of such binders. Aggregate refers to rigid or semi rigid particles, such as sand, gravel, rock, suitable recycled material(s), or even clay and can include fly ash (such as where the amount of fly ash in the mixture exceeds the amount which the mixture can use as a binder). The feed mixture can include other constituents such as one or more plasticizers, stabilizers, dyes, colorings, pigments, and/or resins. If desired, the feed mixture can also include fibrous matter such as continuous and/or discontinuous fibers.

Though the loose concrete feed mixture 26 that is currently preferred is a heavyweight concrete formulation, it is contemplated that the present invention can be used with a medium weight concrete formulation as well as with a lightweight concrete formulation. Where the loose concrete feed mixture 26 is a medium weight or lightweight concrete formulation, aggregate(s) and/or binder(s) having lower density are used. For example, aggregate such as pumice, expanded shale or the like can be used in the production of a loose concrete feed mixture that is of lightweight concrete formulation.

A preferred concrete mixture includes at least 5% fly ash, dry weight, along with aggregate, e.g. sand, coloring, pigment or dye, and a binder such as cement. The use of fly ash not only can help strengthen the concrete product 22 after curing but it also improves acid resistance, such as to acid rain. Fly ash also reduces weight and shrinkage during curing. In addition, fly ash makes the concrete feed mixture more "pasty," improving its extrusion flow characteristics during extrusion of the concrete product 22 out the die 52.

In one preferred concrete mixture used for producing extruded concrete product in accordance with the present invention, fly ash is used as a binder with the amount of fly ash used being at least 25% of the total amount of binder used by dry weight. In one such concrete mixture, between 30% and 80% of the total amount of the binder used is fly ash. In another such concrete mixture, between 40% and 60% of the total amount of binder is fly ash. Another such concrete mixture, the binder is between 50% and 100% fly ash. One currently preferred mixture has about 50% fly ash (50%±2%) dry weight.

Such fly ash binder containing concrete mixture can also include slag as another binder as slag provides an economical binder that also decreases shrinkage, reduces weight, and can help provide improved strength. For example, at least 15% of the remainder of the binder in one preferred concrete mixture that is not fly ash is slag, preferably GGBS or GGBFS. Preferably no more than about 50% of the remainder of the binder that is not fly ash is such slag. In one preferred mixture, at least 25% of the binder is fly ash and at least 20% of the remainder of the binder is slag. The remainder of the binder that is neither fly ash nor slag can be cement, such as Portland cement or the like. In one preferred mixture, the remainder that is neither fly ash nor slag is concrete. In another preferred mixture, at least 50% of the remainder of the binder that is neither fly ash nor slag is cement. The use of both fly ash and slag in these percentages produces a concrete feed mixture that is well suited for extruding concrete product 22 after consolidation to a desired density or within a desired density range as discussed below.

The mixing apparatus 28 uses at least one concrete mixer 30 of a type of known in the art. Examples of suitable types of concrete mixers include continuous mixers and batch mixers. Such a mixer 30 can therefore be equipped with one or more mixing propellers, agitators, or beaters inside of a mixing bowl, tank or chamber used to stir, agitate or otherwise mix together constituents in manner that produces a desired loose concrete feed mixture 26 suitable for use in producing extruded concrete product 22. An example of a suitable mixing tank and loose concrete mixture conveying arrangement is disclosed in commonly owned U.S. Pat. No. 6,309,570, the entirety of which is hereby expressly incorporated by reference herein. Mixing preferably produces a substantially homogeneous loose concrete feed mixture 26, such as in the form of a slurry or paste, having suitable moisture content. Although not shown, mixing apparatus 28 can include a moisture control system employing one or more moisture sensors, e.g. microwave moisture sensors or microwave sensor probes, in communication with a controller used to sense the moisture content of the feed mixture 26 during mixing and control a moisture delivery system capable of adding moisture to the feed mixture 26 during mixing to achieve the desired moisture content.

When these dry concrete feed mixture constituents are mixed with water in mixer 30, an amount of liquid, preferably water, is added to produce a concrete feed mixture having a moisture content between 5% and 7% and preferably about 6%. In one preferred embodiment, an amount of water is added to provide a concrete feed mixture having a moisture content between 6% and 6.25%. Having a desirably low moisture content enables the feed mixture to be subsequently consolidated to a high enough density, as discussed below, to produce an extruded concrete product 22 that is of suitably high strength to meet corresponding standards, such as ASTM 1364 for a facing brick, for its intended use while also maintaining sufficient lubricity during extrusion to be extruded without binding or bridging. One preferred resultant loose concrete feed mixture 26 has a slump of about zero, i.e., zero slump, when transferred to the consolidation chamber 40 of the concrete product extrusion machine 24. Another preferred loose concrete feed mixture 26 has a negative slump.

Once mixing is completed, loose concrete feed mixture 26 is discharged from the mixer 30 where it is conveyed to the extrusion machine 24. In one embodiment, loose concrete feed mixture 26 is transferred via conveyor 32 to batch hopper 34 which in turn delivers it to feed drawer 36. In another embodiment that is not shown, loose concrete feed mixture 26 can be transferred directly to feed drawer 36, such as by using a conveyor or the like. It is also contemplated that the loose concrete feed mixture 26 can be transferred directly to the consolidation chamber 40 of the extrusion machine 24, such as where a feed drawer is not employed. Where a batch hopper 34 is used, the batch hopper 34 is transported, such as by using a conveyor, gantry, carriage or another transport system that is not shown in the drawings, to the feed drawer 36. Although not shown in the drawings, hopper 34 can be equipped with an outlet configured to dock or otherwise seat with an inlet of the feed drawer 36 in a manner that allows concrete feed mixture 26 within the hopper 34 to be received by the feed drawer 36.

Feed drawer 36 can be equipped with an arrangement that urges loose concrete feed mixture 26 from the drawer 36 to the consolidation chamber 40. As shown in FIG. 1, the feed drawer 36 has a feed drive 38 that employs a hydraulic, electric, or pneumatic cylinder 54 from which a reciprocating piston 56 extends that is attached to a feed drawer head 58 disposed inside the feed drawer 36. During operation, the feed drive 38 is operated to move the piston 56 that in turn moves the head 58 within the feed drawer 36 to push loose concrete feed mixture 26 inside the drawer 36 into the consolidation chamber 40.

Before starting to fill the consolidation chamber 40, the extrusion chamber 50, which can also define a bottom portion of the consolidation chamber 40, can be and preferably is blocked off to prevent concrete feed mixture 26 from flowing out the extrusion die 52 during consolidation. As is shown in FIG. 1, the extrusion drive 48 can be configured with a horizontally extending imperforate sealing door or plate 62

(shown in phantom in FIG. 1) that seals a portion of the consolidation chamber 40 along a top portion of the extrusion chamber 50 extend along where the seal plate 62 is shown in FIG. 1 to prevent concrete feed mixture 26 from flowing out the extrusion die 52 during consolidation. When fully extended to a sealing position where the consolidation chamber bottom seal plate 62 extends from one consolidation chamber sidewall 60 to the other consolidation chamber sidewall 61, the seal plate 62 can provide a temporary bottom wall or floor for the consolidation chamber 40 during consolidation that provides a seal, e.g., fluid-tight or gas-tight seal. In a preferred embodiment, a gas-tight seal is provided when the seal plate 62 is extended to such a sealing position to enable a vacuum to be applied during consolidation. When opened, the seal plate 62 functions as a filler door that is opened to allow consolidated mixture 46 into the extrusion chamber 50 to fill the chamber 50 in preparation for extrusion.

Such a seal plate 62 can be part of the extrusion drive 48 or can be separate from extrusion drive 48. Although not shown, where separate from extrusion drive 48, such a seal plate 62 can be driven by its own separate drive, such as a hydraulic, pneumatic or electric actuator, enabling seal plate movement or operation to be controlled independently that of the extrusion drive 48. Where the seal plate 62 is part of the extrusion drive 48, it can be part of a box-like structure 86 that is movable by the drive 48 between a fully extended home position and the retracted "extrusion start" position shown in FIG. 1. Where seal plate 62 is part of box-like structure 86 (shown in phantom in FIG. 1), it can be a generally horizontally extending surface 88 of the box-like structure 86. Use of such a box-like structure 86 advantageously provides strength and possesses structural rigidity sufficient to withstand compaction forces encountered during consolidation.

Depending upon the size of hopper 34 and feed drawer 36, two or more cycles of the feed drive 38 may be required to fill the consolidation chamber 40 with a full charge of loose concrete feed mixture 26 prior to consolidation of the mixture 26. In one preferred implementation of a method in accordance with the present invention, feedback from monitoring the feed drive 38 is used to determine when the consolidation chamber 40 has been sufficiently filled with enough loose concrete feed mixture 26 for consolidation to begin. In one preferred implementation, force or pressure applied to urge loose concrete feed mixture 26 from the feed drawer 36 into the consolidation chamber 40 is applied and a determination is made that the consolidation chamber 40 has been suitably filled or charged upon detecting a rise in force or pressure above a predetermined value or which falls within a predetermined range. For example, where the feed drive 38 is a hydraulic drive, the pressure of the feed drive cylinder 54 can be monitored, such as by controller 66. When a suitably high pressure is detected, indicative that the force being applied by the feed drawer head 58 against loose concrete feed mixture 26 being urged into the consolidation chamber 40 is increasing because the chamber 40 is suitably full, the controller 66 can stop feed drive operation or limit movement of the feed drive 38. For example, in one preferred implementation, once a suitably high pressure is detected, operation of the feed drive 38 is controlled to stop when fully stroked for reasons discussed in more detail below.

When the pressure reaches a predetermined pressure or falls within a predetermined pressure range, the consolidation chamber 40 has been fully charged with loose concrete feed mixture 26 and further cycling of the feed drive 38 is stopped. In a preferred embodiment, the feed drawer head 58 can be moved, e.g., extended to a sealing position, such as the position shown in FIG. 1, where it is generally flush with or in line with the consolidation chamber sidewall 61 providing a seal, e.g., fluid-tight or gas-tight seal, in preparation for consolidation. The head 58 can remain in this position during consolidation. Where a vacuum is applied during consolidation, the seal provided is gas-tight.

If desired, a vertically displaceable door arrangement 59 (shown in phantom in FIG. 1), which includes a sealing door 65 driven by an actuator 69 can instead be moved downwardly into a sealing position (e.g., the position where feed drawer head 58 is located in FIG. 1) when it has been determined that the consolidation chamber 40 has been fully charged. Where a separate door 65 is used, the door 65 can be moved downwardly into the sealing position during retraction of the feed drawer head 58 once it has been determined the chamber 40 has been sufficiently charged. Such a door 65 provides at least a fluid-tight seal and can provide a gas-tight seal when located in the sealing position. Where such a door 65 is used, it preferably enables the feed drawer head 58 to be fully retracted to allow the drawer 36 to be filled with additional loose concrete feed mixture 26 while the concrete feed mixture in the chamber 40 is being consolidated.

If desired, a plurality of spaced apart level sensors 64, such as electrically conductive concrete contact sensors as known in the art, e.g., moisture sensors, can be used instead of or in addition to the aforementioned pressure/force feedback arrangement in determining when the chamber 40 has been sufficiently filled or charged. For example, four vertically spaced apart level sensors 64 are part of a sensor arrangement schematically depicted in FIG. 1 that is linked to controller 66. The use of such fill level sensors 64 in predetermined positions spaced apart within or along the chamber 40 can be employed to determine when the amount of loose concrete feed mixture 26 in the chamber 40 has reached a particular desired fill level, such as when the head of loose mixture 26 in the chamber 40 has reached a full fill level 68 shown in phantom in FIG. 1, or falls within a certain desired fill level range. For example, as is shown in FIG. 1, the uppermost fill level sensor 64 is located at a position corresponding to the consolidation chamber fill level 68 indicating that the chamber 40 is full when the uppermost sensor 64 outputs a signal indicative of the loose concrete feed mixture 26 in the chamber 40 filled up the chamber 40 enabling densification or consolidation of the mixture 26 to begin.

Once filling is completed, consolidation of the loose concrete feed mixture 26 inside the consolidation chamber 40 is performed to "densify" it to an increased density that facilitates uniform extrusion and produces extruded product that is substantially homogenous and substantially uniform in density. In other words, during densification or consolidation, the density of the loose mixture 26 is increased to produce a consolidated mixture 46 having a density greater than that of the loose mixture 26. During consolidation, a vacuum can be and preferably is applied using the vacuum system 44 to reduce the porosity of the mixture in the chamber 40 by evacuating air and other gases trapped in the mixture. Where a vacuum is applied during consolidation, a preferred vacuum system 44 includes a vacuum pump 70 connected to the chamber 40 by one or more vacuum lines 72 providing gas fluid flow communication therebetween.

During application of vacuum, a gas pressure is monitored such as via controller 66 in order to control operation of the vacuum system 44. For example, as shown in FIG. 1, a sensor 91, such as a pressure sensor, vacuum sensor or the like, is linked to the controller 66 and monitored by the controller 66 during application of vacuum in carrying out a vacuum application step of a preferred method of operation. In another embodiment, the controller 66 can monitor pressure via monitoring operation of the vacuum system 44, such as by monitoring the vacuum pump 70 to monitor pressure used for controlling application of vacuum during a vacuum step of the consolidation process. If desired, the controller 66 can monitor both the signal from the pressure sensor 91 and the vacuum pump 70 in controlling vacuum system operation in the manner discussed below.

In one preferred implementation, a vacuum is applied until a desired reduction in pressure occurs, such as by applying the vacuum until a desired sensed pressure is reached. In a preferred implementation of a method of extrusion machine operation, the vacuum system 44 is controllably operated until a desired gas pressure within the chamber 40 is reached that can be thereafter maintained by the system 44, even during the compaction step discussed below. During application of vacuum, the vacuum system 44 is controllably operated until a desired pressure is reached that consolidates the feed mixture in a manner that increases its density but does so in a manner that results in less than 100% compaction to prevent freeze-thaw cycle damage to occur to the extruded concrete product 22 when used for its intended application. Operation of the vacuum system 44 is controlled to eliminate voids to increase density while leaving sufficient voids of sufficient size in the extruded concrete product 22 to enable it or products made from it to be able to withstand freeze thaw cycling that outdoor concrete products will encounter during use.

In one preferred implementation, the vacuum system 44 is controllably operated until the gas pressure within the chamber 40 reaches a pressure of at least −5 inches of Hg and typically somewhere between −5 inches of Hg and −15 inches of Hg. Where an even greater density is sought to be achieved during application of vacuum during consolidation, such as where it is desired to increase the compressive strength in the finished concrete product after curing, operation of the vacuum system 44 can be controlled to achieve a vacuum between −15 inches of Hg and −20 inches of Hg.

Where additional consolidation is desired or needed, such as to further increase density, compaction drive 42 is actuated to apply a physical compacting force against the concrete feed mixture 46 in the consolidation chamber 40. In a preferred embodiment, the compaction drive 42 is a vertically oriented hydraulic ram that includes a cylinder 74 from which a reciprocating piston 76 extends that is attached to a compaction head 78 inside the chamber 40 that directly contacts the feed mixture during compaction. If desired, a plurality of hydraulic compaction drive rams 42 can be employed, such as with the piston 76 of each ram 42 being connected to a common compaction head 78.

During compaction drive operation, as compaction drive piston 76 is extended, it causes the compaction head 78 to move relative to chamber sidewalls 60, 61 downwardly toward concrete feed mixture in the chamber 40 until it directly contacts it. Further application of force by the compaction head 78 compacts feed mixture in the chamber 40 into consolidated concrete mixture 46. Compaction head 78 can be equipped with a generally flat compacting surface 79 that directly contacts feed mixture in the chamber 40 during compaction. In the preferred embodiment depicted in FIG. 1, the compacting surface 79 of the head 78 has a size or surface area substantially the same as the transverse cross-section or cross-sectional area of the chamber 40. In another preferred embodiment, the consolidation chamber 40 overlies the extrusion chamber 50 with the consolidation chamber 40 having a cross-sectional area generally transverse to the direction of applied force of the compaction drive 42 during consolidation that is substantially the same as the cross-sectional surface area of the extrusion chamber 50 extending in a direction generally parallel to the direction of applied force of the extrusion drive 48 during extrusion. As the head 78 of the compaction drive 42 applies force against the concrete mixture in the chamber 40, the pressure of the drive 42 is monitored, such as by controller 66, enabling control of operation of the drive 42 in a manner that also limits compaction to less than 100% compaction.

During consolidation, pressure or force feedback monitoring can be used in determining when the concrete feed mixture being consolidated in the consolidation chamber 40 has had its density increased to at least a desired predetermined density or so it falls within a desired predetermined density range. For example, during physical compaction of concrete feed mixture in the chamber 40 using the compaction drive 42, pressure or force can be monitored and used as feedback in determining when a suitable consolidation density of the mixture has been achieved. In one preferred embodiment, the pressure of the compaction cylinder 74 is monitored, such as by controller 66, to control operation of the compaction drive 42 to produce a consolidated mixture 46 having at least a desired density or a density falling within a desired density range.

For example, in one preferred implementation, the operation of compaction drive 42 is controlled until a desired compaction drive cylinder pressure is reached that is at either a desired threshold pressure or within a desired pressure range indicating that the force being applied by the compaction head 78 directly against consolidated mixture in the chamber 40 has increased its density so it is either at the desired density or falls within the desired density range. Routine experimentation and testing can be done to correlate compaction drive cylinder pressure with a desired minimum consolidated concrete mixture density as well as with a desired consolidated concrete mixture density range. Thereafter, the pressure of the compaction drive 42 can be further monitored and its operation controlled to maintain sufficient force against the consolidated mixture 46 to keep its density at the desired density or within the desired density range.

In a preferred method of extrusion machine operation during consolidation, vacuum and compaction are both done during consolidation. In some instances, it is contemplated that application of a vacuum will not be needed during consolidation with compaction alone being sufficient to consolidate loose concrete feed mixture 26 into consolidated mixture 46 having an increased density suitable for extrusion. For example, there are some concrete feed mixtures where application of vacuum is not needed. Where both vacuum and compaction are performed during consolidation, these consolidation procedures can be done substantially simultaneously or sequentially, and a vacuum can remain applied during compaction. Control of both processes is done in a manner that produces an extruded concrete product 22, such as a concrete brick, which has a high enough density that provides sufficiently high compressive strength while being porous enough at mortar contacting surfaces to absorb enough moisture from mortar during bricklaying that mortar setting is improved and the speed at which the mortar sets is increased.

Application of vacuum and use of physical compaction is employed in a method of operation of an extrusion machine 24 constructed in accordance with the present invention that consolidates loose concrete feed mixture 26 that has been loaded into chamber 40 into consolidated mixture 46 having an increased density greater than that of the loose mixture 26 that is at a desired predetermined minimum density or falls within a desired predetermined density range that results in the consolidated mixture 46 being optimal for extrusion through die 52. Doing so not only facilitates extrusion but also produces extruded product 22 possessing desired beneficial physical characteristics after curing as discussed in more detail below.

Where the loose concrete feed mixture 26 is of a heavyweight concrete formulation, operation of the extrusion machine 24 is controlled during consolidation to increase its density to a density of at least 120 lbs/ft$^3$. In one preferred implementation, extrusion machine operation is controlled in accordance with that described hereinabove or below during consolidation to consolidate a heavyweight loose concrete feed mixture until it has an increased density ranging between about 125 lbs/ft$^3$ and about 135 lbs/ft$^3$. In another preferred implementation, operation is controlled to consolidate heavyweight loose concrete feed mixture 26 into a consolidated mixture 46 that is ready for extrusion that has a density ranging between 128 lbs/ft$^3$ and 132 lbs/ft$^3$.

Where the loose concrete feed mixture 26 is of a medium weight concrete formulation, operation of the extrusion machine 24 is controlled during consolidation to increase its density to so the consolidated mixture 46 has a density of at least 85 lbs/ft$^3$. In one preferred method implementation, extrusion machine operation is controlled in accordance with that described hereinabove or below during consolidation to consolidate a medium weight loose concrete feed mixture until it has an increased density ranging between about 90 lbs/ft$^3$ and about 100 lbs/ft$^3$. In another preferred implementation, operation is controlled to consolidate medium weight loose concrete feed mixture 26 into a consolidated mixture 46 that is ready for extrusion that has a density ranging between 92 lbs/ft$^3$ and 98 lbs/ft$^3$.

Where the loose concrete feed mixture 26 is of a lightweight concrete formulation, operation of the extrusion machine 24 is controlled during consolidation to increase its density to have a density of at least 30 lbs/ft$^3$. In one preferred implementation, extrusion machine operation is controlled during consolidation to consolidate a lightweight loose concrete feed mixture 26 until it has an increased density ranging between about 35 lbs/ft$^3$ and about 80 lbs/ft$^3$. In another preferred implementation, operation is controlled to consolidate lightweight loose concrete feed mixture 26 into a consolidated mixture 46 having a density ranging between 38 lbs/ft$^3$ and 72 lbs/ft$^3$.

In one preferred method, vacuum system 44 is controllably operated to produce a vacuum within the consolidation chamber 40 of between −5 inches Hg and −20 inches Hg that desirably reduces porosity in the loose concrete feed mixture 26 in the gas-tightly sealed chamber 40, increasing its density. Compaction drive 42 is controllably operated until a hydraulic cylinder pressure of at least 1500 psi is reached thereby further increasing density. Depending on the nature and makeup of the concrete mixture being consolidated, operation of the compaction drive 42 can be controlled such that hydraulic compaction drive cylinder pressure falls within a range between 1500 psi and 3000 psi, depending on the desired density of the consolidated mixture 46 sought. In some instances, operating pressures of between 500 and 1000 psi and between 1000 and 2000 psi are contemplated depending on the desired increase in density sought.

In one preferred implementation of a method of consolidation, hydraulic cylinder pressure of compaction drive 42 is monitored and compaction drive operation controlled using hydraulic cylinder pressure as feedback until a desired pressure is reached with the compaction head 78 in direct contact with concrete feed mixture being consolidated in the chamber 40 where the desired pressure correlates with a minimum desired consolidated mixture density or that ensures the consolidated mixture density is within a desired density range. In another preferred implementation of a method of consolidation, hydraulic cylinder pressure of compaction drive 42 is monitored and compaction drive operation controlled using hydraulic cylinder pressure for feedback until a desired pressure is reached that falls within a desired pressure range that correlates with consolidated mixture 46 having a minimum desired density or at least a density falling within a desired density range. Controlling consolidation in this manner helps consistently and repeatedly produce consolidated mixture 46 ready for extrusion having a desirably high density that helps ensure uniform flow through the extrusion die 52 from one extrusion cycle to another thereby repeatably producing concrete product 22 that is of homogeneous construction throughout consistently having substantially uniform density throughout.

After consolidation is completed, the extrusion chamber 50 is opened to allow receipt of consolidated mixture 46 from the consolidation chamber 40. In a currently preferred embodiment, gravity acting upon consolidated mixture 46 in the consolidation chamber 40 causes it to drop into the extrusion chamber 50 when the extrusion chamber 50 is opened. In the preferred concrete product extrusion machine 24 shown in FIG. 1, the compaction force is directed by the compaction drive 42 against loose mixture 26 in the consolidation chamber 40 during consolidation in a direction generally transverse to the direction of the extrusion force directed by the extrusion drive 48 against consolidated mixture 46 disposed in the extrusion chamber 50 during extrusion. So as to allow efficient receipt of consolidated mixture 46 by the extrusion chamber 50, the transverse or horizontally extending cross section of the generally rectangular or square generally vertically extending consolidation chamber 40 is substantially the same as the longitudinal or horizontally extending cross section of the generally rectangular or square generally horizontally extending extrusion chamber 50. Stated another way, the cross section of the consolidation chamber 40 transverse to the direction of compaction force applied against the loose mixture 26 during consolidation is substantially the same as the cross section of the extrusion chamber 50 generally parallel to the direction of extrusion force applied against the consolidated mixture 46 in the extrusion chamber 50 during extrusion. As a result, movement of the consolidated mixture 46 into the extrusion chamber 50 efficiently takes place with a minimum of change of density throughout the portion of the consolidated mixture 46 that ends up being received in the extrusion chamber 50 after consolidation of the loose mixture 26. This advantageously helps maintain a substantially uniform consolidated concrete mixture density throughout the extrusion chamber 50 during both consolidation and extrusion.

The dimensions of the consolidation chamber 40 are preferably selected so as to produce a head of enough consolidated mixture 46 within the chamber 40 for a plurality of extrusion cycles to be carried out before needing to refill the chamber 40. For example, in one preferred embodiment, the chamber 40 has a volume enabling it to be filled with enough loose concrete feed mixture that produces enough consolidated mixture after consolidation to enable at least two extrusion cycles. Providing a head of enough consolidated mixture 46 within the chamber 40 is advantageous because it better maintains the density of the mixture 46 from one cycle to the next and speeds up extrusion, increasing the rate of production of extruded product.

The seal plate 62 is an extrusion chamber filler door that is opened to allow consolidated mixture 46 to be received in the extrusion chamber 50 in preparation for an extrusion cycle. In opening the extrusion chamber 50 where the extrusion drive 48 has a fully extended home position where it remains during consolidation with the seal plate 62 moving substantially in unison therewith, the extrusion drive 48 is retracted to an extrusion start position (depicted in phantom in FIG. 1) to allow consolidated mixture 46 to be received in the extrusion chamber 50. Where the consolidation chamber bottom seal plate 62 is separate from the extrusion drive 48, the seal plate 62 is retracted to an open position to open the extrusion chamber 50. Where the seal plate 62 is separate from extrusion drive 48, drive 48 preferably is already retracted to its extrusion start position, such as the position depicted in phantom in FIG. 1, when the seal plate 62 is opened in preparation for execution of an extrusion cycle.

A vent arrangement 81 can be employed to permit venting of air when the extrusion chamber 50 is opened to eliminate any pressure differential(s) helping to maintain consolidated concrete mixture integrity while minimizing consolidated mixture density changes during its movement into extrusion chamber 50. For example, vent 81 is opened when the extrusion chamber 50 is opened venting air displaced by consolidated mixture 46 entering the extrusion chamber 50. Open vent 81 can also equalize pressure in the extrusion chamber 50 during its opening such as by permitting entry of outside air into chamber 50 as needed during retraction of seal 62 by extrusion drive 48. Afterwards, the vent 81 is closed providing a gas-tight seal, such as during extrusion.

In the embodiment shown in FIG. 1, vent 81 includes an imperforate seal plate 83 that is shown in a closed sealing position where it covers and seals vent ports 85 in adjacent extrusion chamber wall 87. Vent ports 85 extend through extrusion chamber wall 87 and can be distributed along the entire length of wall 87, including substantially uniformly if desired. Vent seal plate 83 can be driven by an actuator 89, such as a hydraulic, pneumatic or electric actuator, which retracts the seal plate 83 in a horizontal direction toward an open venting position where vent ports 85 are unobstructed permitting air flow therethrough in either direction. It should be noted that vent arrangement 81 can be integrally formed with extrusion chamber wall 67 and can be disposed elsewhere including in, on or along one or more sidewalls of extrusion chamber 50. Once venting is no longer desired, such as during extrusion, actuator 89 moves the vent seal plate 83 back to its closed sealing position gas-tightly sealing vent ports 85. As depicted in FIG. 1, actuator 89 can be linked to controller 66 that is configured to control its operation.

In one preferred embodiment, the extrusion drive 48 is a hydraulic ram having a hydraulic cylinder 80 from which a reciprocating piston 82 extends that carries an extrusion head 84 received in the extrusion chamber 50. In one preferred embodiment not shown in the drawings, a plurality of hydraulic extrusion drive rams 48 are employed in a side-by-side configuration with the cylinder 80 of each ram 48 being connected to common extrusion head 84. Head 84 has a generally flat and vertically extending extrusion surface 93 that directly contacts consolidated mixture 46 received in the extrusion chamber 50. Head 84 can be part of box-like structure 86 that includes seal plate 62 integrally formed of upper surface 88 with box-like structure 86 moving substantially in unison with head 84 and piston 82 during operation.

Once the extrusion chamber 50 has been loaded with a charge of consolidated mixture 46, the compaction head 78 of the compaction drive 42 is indexed downwardly until it once again bears against consolidated mixture 46 in the consolidation chamber 40. It should be noted that the compaction drive 42 at least somewhat retracts the compaction head 78 away from consolidated mixture 46 in preparation for extrusion chamber opening before being downwardly indexed back into contact with the consolidated mixture 46. Since consolidated mixture 46 moves downwardly when the extrusion chamber 50 is opened, compaction head 78 must be indexed beyond the position where it previously contacted the consolidated mixture 46 before extrusion chamber opening.

As with compaction during consolidation, compaction drive pressure is monitored and operation of the compaction drive 42 is controlled using pressure as feedback, until the pressure reaches a desired pressure that correlates with the consolidated mixture 46, including that which has been received in the extrusion chamber 50, being at least at the desired density or falling within a desired pressure range that correlates with the density of the consolidated mixture 46 being within a desired density range. It is contemplated that the hydraulic cylinder pressure(s) as well as the desired consolidated concrete mixture density and/or density range(s) will be the same as discussed above with regard to compaction during consolidation using compaction drive 42. This helps maintain the consolidated mixture 46 at the desired density or within a desired density range that is most optimal for extrusion in preparation for extrusion.

Once feedback from the compaction drive 42 in accordance with that discussed above confirms that the consolidated mixture 46 has been consolidated or densified to a density suitable for extrusion, a lock or locking arrangement (not shown), such as a hydraulic cylinder locking arrangement known in the art, can be set to lock in place the head 78 and/or piston 76 of the compaction drive 42. This enables the density of the consolidated mixture 46 within the extrusion chamber 50 to be maintained at a desired density, e.g., at or above a desired minimum density, or within a desired predetermined density range during extrusions. This also enables the extrusion drive 48 to be actuated with the locked-in-place compaction head 78 providing a fixed upper extrusion chamber wall or barrier that remains fixed during extrusion. In one preferred implementation of an extrusion method, the extrusion drive 48 is actuated after detection of the desired compaction drive pressure and after locking of the compaction drive 42. Depending on how many charges the consolidation chamber 40 holds, the compaction drive 48 can be and preferably is indexed further downwardly after each extrusion cycle and is locked in place while another extrusion cycle is carried out. When the chamber 40 needs to be recharged, the compaction drive 42 is returned to a home position, such as the home position depicted in FIG. 1 with the compaction head 78 disposed at or near the top of the chamber 40.

During extrusion, as the extrusion head 84 is extended outwardly toward the extrusion die 52, consolidated mixture 46 is urged toward and through the extrusion die 52. The pressure of the extrusion drive 48 can be monitored, such as by controller 66, enabling operation of the extrusion drive 48 to be controlled in a desired manner. Such monitoring can be done by monitoring the pressure of the hydraulic extrusion drive cylinder 80 during extrusion, including throughout part of or even substantially the entire extrusion stroke of the drive 48.

After an extrusion cycle is completed, the extrusion head 84 is retracted back to its start position allowing additional consolidated mixture 46 to be received in the extrusion chamber 50. Where the consolidation chamber 40 extends generally vertically as depicted in FIG. 1, gravity acts on the consolidated mixture 46 and causes the mixture to drop into the extrusion chamber 50. Further compaction occurs by further indexing the compaction drive 42 in the manner discussed above, including while vacuum is applied if application of vacuum is desired during this time to achieve a particular desired porosity and increased density for increased compressive strength. Thereafter, addition extrusion cycles are executed until the amount of consolidated mixture in the consolidation chamber 40 is insufficient for additional extrusion cycles to be performed. At that point, another consolidation filling cycle is executed, followed by consolidation and then extrusion as discussed above.

For example, in one preferred implementation, operation of the extrusion drive 48 is controlled to try and maintain extrusion drive pressure within a desired pressure range that maintains the consolidated mixture 46 being extruded at a desired rate of extrusion while remaining at the desired density or within the desired density range. In one preferred embodiment, the extrusion drive 48 is actuated, its pressure monitored, and operation controlled to achieve a hydraulic extrusion cylinder pressure during extrusion of at least 1500 psi and which does not exceed 3000 psi to maintain the consolidated mixture 46 being extruded from the extrusion chamber 50 at the desired density or within the desired density range. In some instances, operating pressures of between 500 and 1000 psi or between 1000 and 2000 psi are instead contemplated. Such pressure helps ensure a uniform rate of flow, i.e., uniform extrusion rate, through the extrusion die 52 as density further increases during extrusion through the die 52 thereby producing a concrete product 22 that is of substantially homogeneous construction throughout having a substantially uniform density throughout.

Such precise control of the density of the consolidated mixture 46 by an extrusion machine 24 constructed in accordance with the present invention, results in a concrete product 22 being extruded through a die 52 that further increases density where extrusion occurs at a substantially uniform rate across and throughout substantially the entire cross-section of the product 22. This produces a high-strength concrete product 22 of substantially homogenous construction and density, including after curing, which can be processed after extrusion into a plurality of concrete components that each possesses compression strength that meets or exceeds the ASTM specification corresponding to the type of extruded concrete product or concrete extrusion being produced.

For example, in one preferred embodiment, a high-strength concrete product 22 of substantially homogenous construction and density is produced which can be processed after extrusion and before curing into one or more concrete products, e.g., extruded concrete facing brick, having a compressive strength of at least 7000 psi after curing. In one preferred embodiment, the resultant concrete product and/or concrete components produced after curing possesses compression strength of at least 7500 psi. In another preferred embodiment, the compression strength is about 8000 psi.

Figures 2, 4:
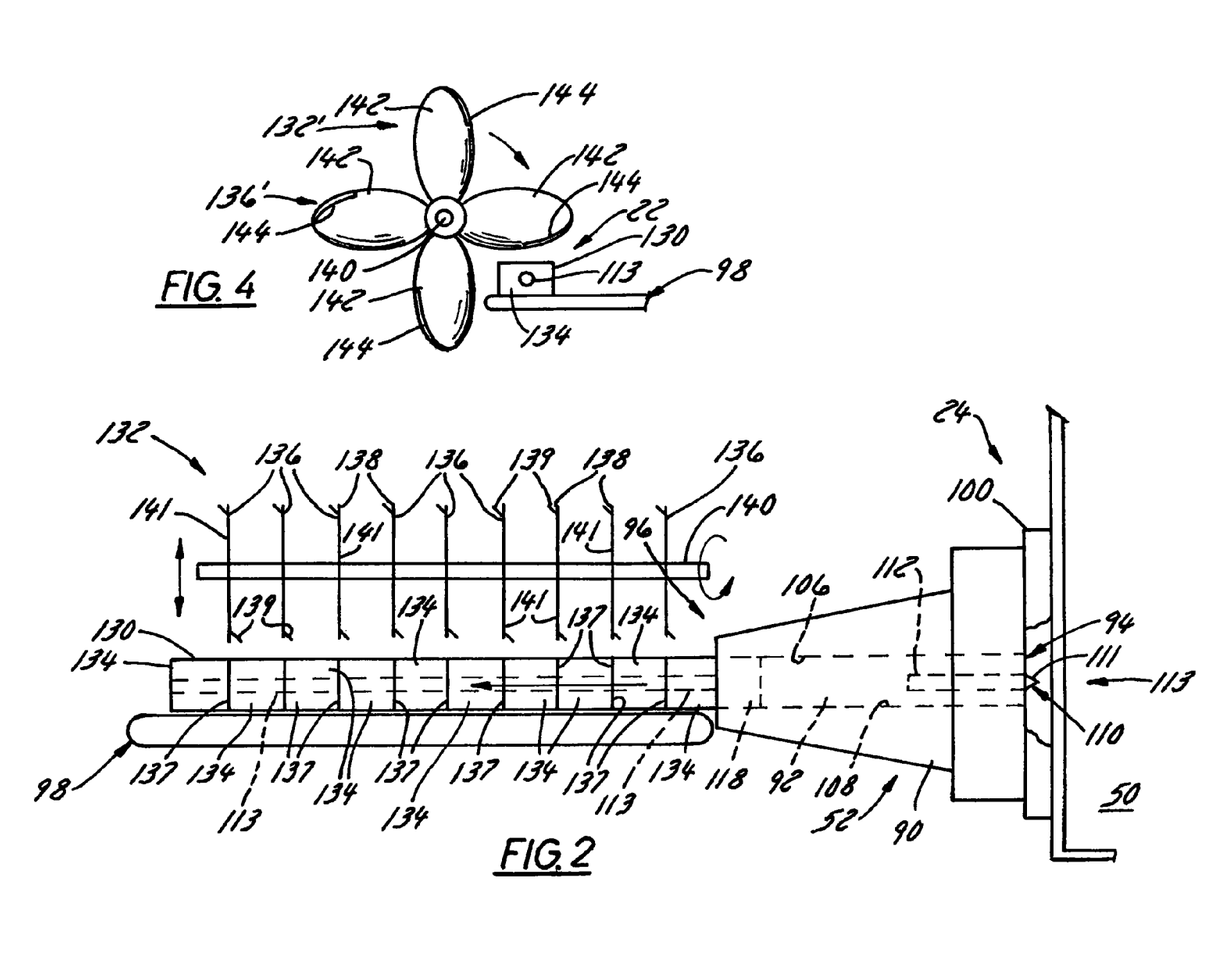
FIG. 2 is a side elevation view illustrating a concrete component extruded from the extrusion machine of FIG. 1 and post extrusion processing of the extruded concrete component into one or more extruded concrete products.
FIG. 4 is an end elevation view of a preferred concrete product processing embodiment capable of processing extruded concrete into one or more concrete products.
Figure 3:
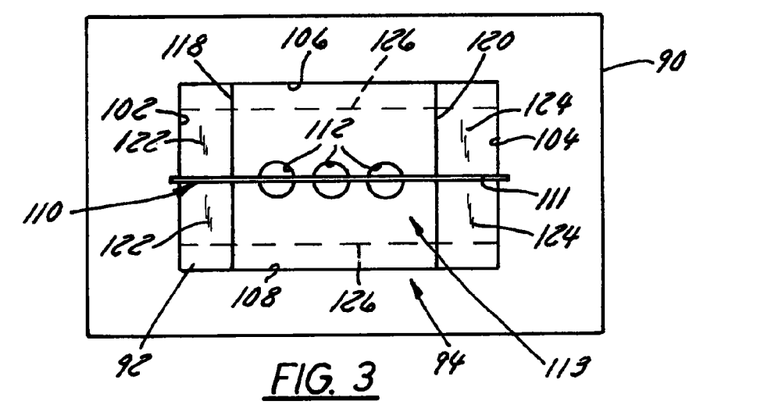
FIG. 3 an inlet plan view of an extrusion die arrangement of the extrusion machine of FIG. 1.

FIGS. 2 and 3 illustrate a preferred embodiment of a die 52 of the extrusion machine 24 in more detail. Die 52 has an outer die casing 90 with a die cavity 92 formed within that has an inlet 94 in fluid flow communication with the extrusion chamber 50 and an outlet 96 that deposits the extruded concrete product 22 onto a surface 98, such as on a table, conveyor or the like. The die 52 can include a collar 100 used to removably mount the die 52 to part of the extrusion machine 24. The die cavity 92 is rectangular, can be square, and is defined by a pair of spaced apart sidewalls 102, 104, a top wall 106 and a bottom wall 108. In a preferred embodiment, the sidewalls 102 and 104 are substantially parallel and the top and bottom walls 106 and 108 are substantially parallel defining an extrusion die cavity 92 that does not taper. Although not shown, a transition that is of funnel-shaped or tapered construction can be disposed in the extrusion chamber 50 upstream of the die inlet 94 that is in registry with the inlet 94.

Where the die 52 is configured to produce a concrete component that is a concrete facing brick, a core hole forming arrangement 113 can be used that includes a core forming bar 110 disposed upstream of the die outlet 96 and configured so as to facilitate flow of consolidated concrete mixture around the bar 110 during extrusion while forming core holes 113 in the extruded product 22. In FIG. 2, part of the collar 100 is broken away to better illustrate part of the core hole forming arrangement 113, which is shown in more detail in FIG. 3. With reference to FIG. 3, the core forming bar 110 has a cross bar 111 that carries a plurality of elongate generally cylindrical cores 112 that extend axially into the die cavity 92 toward the die outlet 96 that form brick core holes 113 in the concrete product 22 extruded from the die 52. Each core 112 can be tubular and configured with a tapered, closed end facing toward the extrusion chamber 50, such as depicted in FIG. 2. In a preferred embodiment, the core hole forming arrangement 113 can be fixed, such as to part of the die 52. For example, in one preferred embodiment, the ends 114, 116 of the bar 110 are fixed to the die 52.

Where it is desired to trim part of the concrete product 22 being extruded from the die 52, one or more trim bars 118, 120 can be used. As is shown in FIGS. 2 and 3, vertically oriented generally parallel trim bars 118, 120 can be disposed in the die cavity 92, such as at or adjacent the die outlet 96 to trim away sides from the concrete product 22 being extruded from the die 52. Where trim bars, e.g., trim bars 118, 120, are used, they can be fixed, such as by being fixed to one or both die cavity defining walls 106, 108. Trim bars 118, 120 can be part of or separate from the core hole forming arrangement.

In a preferred embodiment, the extrusion die 52 has an internal die cavity 92 that is generally rectangular, e.g., square, of non-tapered construction defined by a plurality of pairs of spaced apart and substantially parallel walls 102, 104, 106, and 108 that are each substantially planar and can be elongate. For example, the internal die cavity 92 of the extrusion die 52 shown in FIGS. 2 and 3 is defined by a first pair of spaced apart and substantially parallel generally planar walls 102 and 104 and a second pair of spaced apart and substantially parallel generally planar walls 106 and 108 such that the internal die cavity 92 is generally rectangular in cross section and lacks any taper. Such an extrusion die 52 constructed in accordance with the present invention can be used without a core hole forming arrangement 113, such as when it is desired to produce extruded concrete products other than concrete bricks.

Each extruded trim portion 122, 124 can be recycled such as by being returned to the mixer 30 or to the extrusion machine 24, such as by being deposited in hopper 34 or into feed drawer 36. While vertically oriented trim bars 118, 120 are depicted in FIGS. 2 and 3, such as for trimming the concrete product 22 to a desired width, it should be recognized that one or more horizontally extending trim bars, such as trim bars 126, 128 shown in FIG. 3 in phantom, can be used. It is contemplated that any combination of trim bars 118, 120, 126, and 128 can be used or none at all if desired.

The extruded concrete product 22 shown in FIG. 2 is an elongate extruded concrete slug 130 that is in turn processed after extrusion, such as by cutting, into one or more finished concrete articles or products. For example, as is shown in FIG. 2, a cutter 132 is used to cut the extruded concrete slug 130 after extrusion into a plurality of concrete products 134. Preferably, the slug 130 is cut immediately after extrusion.

The cutter 132 can include a plurality of cutting blades 136 spaced apart a desired distance so as to cut along cut lines 137 shown in FIG. 2 to produce concrete components 134 having the desired size after cutting is performed. The cutting blades 136 can be circular, toothed, or otherwise configured with an outer surface 138 that facilitates cutting the slug 130 into a plurality of pairs, i.e. at least three, of components 134 substantially simultaneously. Cutting blades 136 can be carried by a shaft 140 that is rotated by a rotary drive (not shown) that can be an electric motor, a hydraulic motor, a pneumatic motor, or the like. Such a rotary drive can be directly connected to the shaft 140, coupled via a coupling, connected by a chain (not shown), or connected by a belt (not shown).

While the cutting blades 136 can be circular, each cutting blade 136' of the cutter 132', such as the reel cutter 132' shown in FIG. 4, can have a plurality of spaced apart cutting arms 142 forming a reel cutter arrangement with each arm 142 rotated or indexed during cutting of a single slug 130. Rotation can be continuous or can be less than a complete rotation, typically between a quarter of a rotation and a third of a rotation permitting advancement of the slug or a new slug in between. Each cutting arm 142 has an exterior cutting or contact surface 144 configured to facilitate cutting or extruded concrete material separation. For example, in one embodiment, cutting or contact surface 144 is three dimensionally contoured or configured relative to the body of each cutting blade 136' so as to be offset in a manner that facilitates cutting extruded concrete product 22 into a plurality of concrete components or products that each can be a concrete facing brick 134. Cutting or contact surface 144 preferably cuts or separates extruded concrete product 22 into a plurality of concrete components or products that each can be a concrete facing brick 134 in a manner that imparts mortar bonding surface(s) 146, 148 having an increased moisture absorption region 158 after curing.

Figure 5:
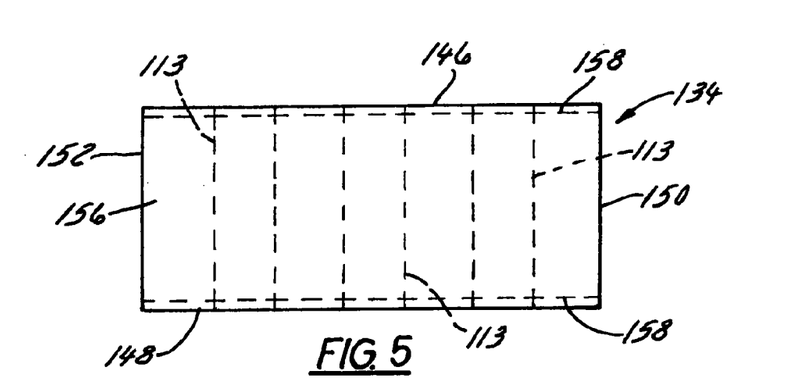
FIG. 5 is a side elevation view of a concrete brick produced using the system and extrusion machine after post-extrusion processing.
Figure 6:
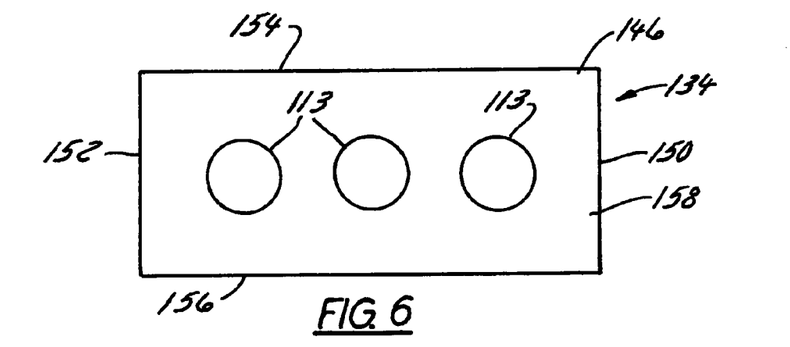
FIG. 6 is a top plan view of the extruded concrete brick of FIG. 5.

FIGS. 5 and 6 illustrate an extruded concrete component 134 that has been cut from a slug 130 (FIGS. 2 and 4) extruded from the extrusion machine 24 that is a concrete brick having the same dimensions as a ceramic or fired brick used in masonry construction. Concrete brick 134 has a top mortar bonding surface 146, a bottom mortar bonding surface 148, a pair of end walls 150, 152, and a pair of sidewalls 154, 156 defining a brick 134 having rectangular transverse and longitudinal cross sections.

During cutting using cutter 132 or 132', the top and bottom mortar bonding surfaces 146, 148 produced at the cutting interface 137 (FIG. 2) between adjacent bricks formed from slug 130 have a relatively thin region 158 of increased moisture absorption after curing. Although the cutter 132 shown in FIG. 2 has nine cutting blades 136 capable of cutting ten concrete bricks 134 at the same time, the cutter 132 preferably is equipped with another cutting blade (not shown) at each end that trims away a very small amount of concrete material from slug 130 to provide a moisture absorption region 158 of the mortar bonding surface at each end of the slug 130. For example, shaft 140 can have an additional cutting blade 136 at each end to do this. It is contemplated that the same or similar configuration can be employed for cutter 132' to ensure each surface 146, 148 of each brick 134 that is intended to bond with mortar during bricklaying is formed with such an increased moisture absorption region 158. It should also be noted that more or less cutting blades can be used depending the length of the slug 130 produced during extrusion.

During cutting, the interaction of the cutting blade 136 with the freshly extruded concrete slug 130 disturbs, such as by tearing during cutting, the yet to be cured concrete along both sides of the cutting interface 137 produced during cutting producing a relatively thin region 158 in each brick 134 that has decreased density and/or increased porosity. In one preferred embodiment, each cutting blade 136 has a tooth 139 that is outwardly offset at an oblique angle from the generally planar body or spider 141 of the blade 136 that engages the extruded slug 130 during cutting in a manner that creates increased absorption region 158. After the brick 134 is cured, this thin region 158 of increased moisture absorption on each mortar bonding surface 146, 148 of the brick 134 provides enhanced bonding with mortar during bricklaying. This enables a greater number of concrete bricks 134 to be laid at one time and be supported by wet mortar thereby decreasing the "float" as it is known in the industry.

In one preferred embodiment, each cutting blade 136 configured to form such an increased moisture absorption region 158 in a brick 134 has a single tooth 139 acutely angled relative to the generally planar body or spider 141 the blade 136. In another preferred embodiment, each cutting blade 136 has a plurality of acutely angled teeth 139. Where a cutting blade 136 includes a tooth 139, it can be formed with an outer peripheral edge bent at an angle to form the tooth 139 or the tooth 139 can be separately formed and attached to the body or spider 141 of the blade 136 such as by welding or the like.

The increased moisture absorption region 158 produced at the cutting interface 137 of adjacent concrete bricks 134 has a depth or thickness of at least 50 microns. In one embodiment, the depth or thickness of the moisture absorption region 158 of each mortar bonding surface, e.g. mortar bonding surface 146, 148, of each brick 134 is no greater than 1/16 of an inch or about 1600 microns. In one preferred embodiment, the depth or thickness of each moisture absorption region 158 is no greater than about 1/32 of an inch or about 800 microns. In another preferred embodiment, the depth or thickness of each moisture absorption region 158 is about 1/32 of an inch.

After curing, the moisture absorption region 158 of each mortar bonding surface 146, 148 of each brick 134 has moisture absorption of at least 7% with the rest of the brick 134 having moisture absorption of no greater than 5%. In one preferred embodiment, the moisture absorption region 158 of each mortar bonding surface 146, 148 of each brick 134 has moisture absorption of between 8% and 10% with the rest of the brick 134 having a moisture absorption of no greater than 4% and typically about 3%.

As previously discussed, producing a cured concrete brick 134 having mortar bonding surfaces 146, 148 with the increased moisture absorption advantageously enables these surfaces 146, 148 to more quickly bond with mortar during bricklaying. This can not only produce a better bond with the mortar, but it also enables a greater number of layers of brick 134 to be laid while the mortar is wet. By decreasing the "float," such a concrete brick 134 advantageously increases building productivity.

Although the mortar bonding surfaces 146, 148 of a concrete brick 134 of the present invention have increased moisture absorption, the rest of the brick 134 has a much lower rate of moisture absorption than conventional concrete brick known in the prior art thereby resisting moisture infiltration through any exposed surface(s), e.g., faces or sidewalls 154 and/or 156 better than a conventional concrete brick. In fact, giving the relatively high density at which the brick 134 was extruded and which results after curing, a brick 134 constructed in accordance with the present invention is relatively moisture impermeable everywhere but at the relatively thin region 158 of each mortar bonding surface 146, 148.

After cutting, the bricks 134 are moved to a place where they can be cured. For example, after cutting, the bricks 134 can be moved onto a pallet and transported using a conveyor to a curing room where the bricks 134 are typically cured for several hours, typically at least six hours, before being ready for packaging and shipment. A concrete brick 134 produced using a concrete mixture mixed in accordance with the present invention that is consolidated and extruded in accordance with a method of the present invention, such as by using an extrusion machine 24 constructed in accordance with the present invention, has a desirably high compressive strength and desirably low moisture absorption with increased moisture absorption at the mortar bonding surfaces while having an outer texture, color and appearance that is virtually indistinguishable from a clay or ceramic brick. Such a brick 134 preferably meets or exceeds ASTM 1634.

It should be noted that while the concrete feed mixtures, the extrusion machine 24, and the methods of making extruded concrete product described herein are particularly well suited for making a concrete facing brick 134 that can be of cored construction, they are also well suited for use in producing other types of extruded concrete product and concrete extrusions. For example, the loose concrete feed mixtures, extrusion machine 24, and methods described above are also well suited for making extruded concrete floor tile, extruded concrete retaining wall, extruded concrete paving stone, e.g., pavers such as interlocking pavers, extruded concrete roof tile, extruded concrete roof shingles, concrete plates, and extruded concrete curbing. Of course, other types of extruded concrete products, including other types of concrete building products, are contemplated as the aforementioned extruded concrete products set forth above are not meant to be limiting. Depending on the nature of such extruded concrete product being produced, it is anticipated that the core hole forming arrangement shown in FIGS. 2 and 3 may not be needed. In addition, it is also anticipated that a different type of cutter or cutting arrangement may be employed that differs from that which is depicted in FIG. 2 and/or FIG. 4 and in at least some instances may also not be needed.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A concrete product extrusion machine comprising:
   a consolidation chamber that receives a concrete feed mixture and an extrusion chamber;
   an extrusion chamber filler door having a closed position where the door is disposed between the consolidation chamber and the extrusion chamber, and an open position disposed from the closed position where the consolidation chamber is in communication with the extrusion chamber;
   a compaction drive that applies force in one direction against the concrete feed mixture when compacting the concrete feed mixture into a consolidated concrete mixture having increased density that is delivered into the extrusion chamber when the filler door is disposed in an open position; and
   an extrusion drive that applies force in another direction against the consolidated concrete mixture when extruding the consolidated concrete mixture through an extrusion die; and
   wherein the consolidation chamber extends vertically upwardly overlying the extrusion chamber with the consolidation chamber oriented generally perpendicular to the extrusion chamber, and wherein the consolidation chamber has a transverse cross-sectional area substantially the same as a longitudinal generally horizontally extending cross-sectional area of the extrusion chamber enabling concrete feed mixture to be compacted into consolidated concrete feed mixture having a substantially uniform density throughout the extrusion chamber when consolidated concrete mixture is received in the extrusion chamber.

2. The concrete product extrusion machine of claim 1 further comprising a vacuum system in gas flow communication with the consolidation chamber applying a vacuum to the consolidation chamber during compaction of the concrete feed mixture into the consolidated concrete mixture.

3. The concrete product extrusion machine of claim 1 further comprising: (a) a feed drawer in communication with the consolidation chamber that receives the concrete feed mixture, (b) a feed drive that conveys the concrete feed mixture from the feed drawer into the consolidation chamber, and (c) a feed drawer door movable between (i) a closed position where the feed drawer door is disposed between the consolidation chamber and the feed drawer, and (ii) an open position disposed from the closed position enabling the feed drive to convey the concrete feed mixture from the feed drawer into the consolidation chamber.

4. The concrete product extrusion machine of claim 1 further comprising (a) a surface upon which a concrete slug is extruded from the extrusion chamber through the extrusion die, and (b) a rotary cutting arrangement having a plurality of spaced apart rotary cutters that cut the concrete slug into a plurality of concrete articles with each cutter comprised of one of (i) a cutting blade having a tooth outwardly offset at an oblique angle relative thereto, and (ii) at least one cutting arm having a leading concrete slug contacting edge that is three dimensionally offset therefrom.

5. The concrete product extrusion machine of claim 1, wherein the consolidation chamber is elongate and overlies the extrusion chamber, and wherein the consolidation chamber has a generally rectangular or generally square transverse cross section and where the extrusion chamber has a generally rectangular or generally square cross section.

6. A concrete product extrusion machine comprising:
   a consolidation chamber that receives a concrete feed mixture and an extrusion chamber;
   an extrusion chamber filler door having a closed position where the door is disposed between the consolidation chamber and the extrusion chamber, and an open position disposed from the closed position where the consolidation chamber is in communication with the extrusion chamber;
   a compaction drive that applies force in one direction against the concrete feed mixture when compacting the concrete feed mixture into a consolidated concrete mixture having increased density that is delivered into the extrusion chamber when the filler door is disposed in an open position; and
   an extrusion drive that applies force in another direction against the consolidated concrete mixture when extruding the consolidated concrete mixture through an extrusion die; and
   wherein the extrusion drive comprises a reciprocable extrusion head defining an endwall of the extrusion chamber opposite the extrusion die, a longitudinally extending sidewall disposed therebetween; and
   wherein the consolidation drive comprises a reciprocable compaction head opposite the extrusion chamber sidewall having a width substantially the same as a length of the extrusion chamber sidewall.

7. The concrete product extrusion machine of claim 6 wherein the compaction drive comprises a hydraulic cylinder reciprocating the compaction head in the one direction and the extrusion drive comprises a hydraulic cylinder reciprocating the extrusion head in the another direction.

8. The concrete product extrusion machine of claim 7 wherein the one direction is generally transverse to the another direction.

9. The concrete product extrusion machine of claim 6 wherein the consolidation chamber is elongate and overlies the extrusion chamber, and wherein the consolidation chamber has a generally rectangular or generally square transverse cross section and where the extrusion chamber has a generally rectangular or generally square cross section.

10. The concrete product extrusion machine of claim 9 wherein consolidation chamber extends generally vertically upwardly and the extrusion chamber extends generally horizontally.

11. The concrete product extrusion machine of claim 10 wherein the extrusion chamber comprises part of the consolidation chamber when the filler door is disposed in an open position.

12. The concrete product extrusion machine of claim 6 wherein the filler door provides a substantially gas tight seal with the consolidation chamber when the filler door is closed and further comprising a vacuum system applying a vacuum to the consolidation chamber when the filler door is closed during compaction of the concrete feed mixture in the consolidation chamber into the consolidated concrete mixture by the compaction drive.

13. A concrete product extrusion machine comprising:
a consolidation chamber that receives a concrete feed mixture and an extrusion chamber;
an extrusion chamber filler door having a closed position where the door is disposed between the consolidation chamber and the extrusion chamber, and an open position disposed from the closed position where the consolidation chamber is in communication with the extrusion chamber;
a compaction drive that applies force in one direction against the concrete feed mixture when compacting the concrete feed mixture into a consolidated concrete mixture having increased density that is delivered into the extrusion chamber when the filler door is disposed in an open position;
an extrusion drive that applies force in another direction against the consolidated concrete mixture when extruding the consolidated concrete mixture through an extrusion die;
a feed drawer disposed alongside the consolidation chamber that receives the concrete feed mixture;
a feed drive that conveys the concrete feed mixture from the feed drawer into the consolidation chamber; and
a feed drawer door that is disposed (i) in a closed position during compaction of the concrete feed mixture, and (ii) in an open position disposed from the closed position when the feed drive is conveying the concrete feed mixture from the feed drawer into the consolidation chamber.

14. The concrete product extrusion machine of claim 13 wherein the filler door provides a substantially gas tight seal with the consolidation chamber when the filler door is closed and further comprising a vacuum system in gas flow communication with the consolidation chamber applying a vacuum to the consolidation chamber when the filler door is closed facilitating compaction of the concrete feed mixture in the consolidation chamber.

15. The concrete product extrusion machine of claim 13 wherein the feed drawer door provides a substantially gas-tight seal with the consolidation chamber when closed and further comprising a vacuum system applying a vacuum to the consolidation chamber when the feed drawer door is closed facilitating compaction of the concrete feed mixture in the consolidation chamber.

16. The concrete product extrusion machine of claim 13 further comprising (a) a plurality of consolidation chamber fill level sensors spaced apart along the consolidation chamber, and (b) a controller linked to the plurality of fill level sensors and the feeder drive that is configured to control operation of the feeder drive by conveying concrete feed mixture into the consolidation chamber until the consolidation chamber is substantially filled with concrete feed mixture.

17. The concrete product extrusion machine of claim 13, wherein the consolidation chamber is elongate and overlies the extrusion chamber, and wherein the consolidation chamber has a generally rectangular or generally square transverse cross section and where the extrusion chamber has a generally rectangular or square cross section.

18. A concrete product extrusion machine comprising:
a consolidation chamber that receives a concrete feed mixture and that is inline with an extrusion chamber;
an extrusion chamber filler door that is reciprocable between (a) a closed position where the filler door is located between the consolidation chamber and the extrusion chamber, and (b) an open position located away from the closed position where the extrusion chamber forms part of the consolidation chamber;
a compaction drive that applies force in one direction against the concrete feed mixture when compacting the concrete feed mixture into a consolidated concrete mixture having increased density; and
an extrusion drive that applies force in another direction against the consolidated concrete mixture when extruding the consolidated concrete mixture through an extrusion die that is generally transverse to the one direction; and
wherein the extrusion drive comprises a reciprocable extrusion head defining an endwall of the extrusion chamber opposite the extrusion die, the extrusion chamber having a longitudinally extending sidewall disposed therebetween, and wherein the consolidation drive comprises a reciprocable compaction head opposite the extrusion chamber sidewall having a width substantially the same as a length of the extrusion chamber sidewall.

19. The concrete product extrusion machine of claim 18 wherein the compaction drive comprises a hydraulic compaction drive having an extensible compaction head disposed in the consolidation chamber that applies force in the one direction, the consolidation chamber has a cross-sectional area transverse to the direction of compaction head applied force, the extrusion drive comprises a hydraulic extrusion drive having an extensible extrusion head disposed in the extrusion chamber that applies force transverse to the compaction head force, and wherein the extrusion chamber has a cross-sectional area generally parallel to the direction of extrusion head applied force that is substantially the same as the consolidation chamber cross-sectional area.

20. The concrete product extrusion machine of claim 18 further comprising a vacuum system applying a vacuum to the consolidation chamber during compaction of the concrete feed mixture into the consolidated concrete mixture.

21. The concrete product extrusion machine of claim 20 wherein (a) the filler door is closed during application of vacuum by the vacuum system to the consolidation chamber, and (b) the filler door provides a substantially gas-tight seal with the consolidation chamber when the filler door is closed.

22. A concrete product extrusion machine comprising:
- a vertically extending consolidation chamber that receives a concrete feed mixture and that is inline with and overlies a generally horizontally extending extrusion chamber;
- a compaction drive comprising a first hydraulic cylinder carrying a compaction head that applies a compaction force against the concrete feed mixture when compacting the concrete feed mixture into a consolidated concrete mixture having increased density; and
- an extrusion drive comprising a second hydraulic cylinder generally transverse to the first hydraulic cylinder, the second hydraulic cylinder carrying an extrusion head that applies force against the consolidated concrete mixture when extruding the consolidated concrete mixture through an extrusion die that is generally transverse to the one direction;
- an extrusion chamber filler door that is movable between (a) a closed position preventing the extrusion chamber from receiving consolidated concrete mixture from the consolidation chamber, and (b) an open position disposed from the closed position enabling the extrusion chamber to receive consolidated concrete mixture from the consolidation chamber; and
- a vacuum system in gas flow communication with the consolidation chamber that applies a vacuum to the consolidation chamber facilitating compaction of the concrete feed mixture into the consolidated concrete mixture; and
- wherein the compaction force is applied against consolidated concrete mixture in the consolidation chamber during extrusion of consolidated concrete mixture in the extrusion chamber out the die.

23. The concrete product extrusion machine of claim 22 wherein the filler door provides a substantially fluid-tight seal or a substantially gas-tight seal with the consolidation chamber when the filler door is closed.

24. The concrete product extrusion machine of claim 23 wherein the filler door is closed (a) during application of vacuum to the consolidation chamber by the vacuum system during compaction of the concrete feed mixture into the consolidated concrete mixture, and (b) during extrusion of consolidated concrete mixture from the extrusion chamber.

\* \* \* \* \*